United States Patent [19]

Miller

[11] 4,321,178

[45] Mar. 23, 1982

[54] WATER-RESISTANT BLACK FLEXOGRAPHIC INK

[75] Inventor: Eugene L. Miller, Chicago, Ill.

[73] Assignee: American Cyanamid Company, Stamford, Conn.

[21] Appl. No.: 200,189

[22] Filed: Oct. 24, 1980

[51] Int. Cl.$^3$ ............................................. C08L 00/00
[52] U.S. Cl. ..................................... 524/159; 106/22; 8/680; 544/348
[58] Field of Search .............. 544/348; 8/680; 106/22; 260/29.6 R

[56] References Cited

U.S. PATENT DOCUMENTS

| | | | |
|---|---|---|---|
| 1,841,876 | 1/1932 | Buc | 106/22 |
| 2,567,964 | 9/1951 | Petke | 106/22 |
| 2,772,175 | 11/1956 | Beatty | 106/22 |

Primary Examiner—Joseph L. Schofer
Assistant Examiner—N. Sarafim
Attorney, Agent, or Firm—Bruce F. Jacobs; Frank M. Van Riet

[57] ABSTRACT

The ammonium salt of Nigrosine Sulfonic Acid, a novel compound, has been discovered to produce a black flexographic ink with superior water-resistance properties.

2 Claims, No Drawings

WATER-RESISTANT BLACK FLEXOGRAPHIC INK

The present invention relates generally to water-resistant black flexographic inks and, in particular, to the use of the ammonium salt of Nigrosine Sulfonic Acid in a water-based flexographic ink to provide an ink having outstanding water resistance.

The flexographic printing technique has been used for many years and involves transfer of a fluid ink to rubber printing plates which have been attached to a cylinder by adhesive. The ink film is then transferred from the printing plates to a plastic film, foil, or paper which is to be printed. Many millions of pounds of flexographic ink are marketed annually.

Early flexographic inks were called "aniline" inks since they consisted of alcohol solutions of resins (for example, shellac) colored with alcohol-soluble "aniline" dyes. Demand for better lightfastness and improved resistance to bleed made it necessary to use pigments for some applications. Today, more than 80% of the flexographic inks sold contain pigments.

Flexographic inks are generally of two basic types—the solvent type and the aqueous type. The alcohol types are solutions of rosin esters, shellac, nitrocotton, and other alcohol-soluble binders, or cosolvent polyamide types, which are solutions of polyamide resins in alcohol, aliphatic hydrocarbon and/or aliphatic esters.

The aqueous flexographic types consist of the alkaline types, prepared by "dissolving" acidic resins (for example, shellac, fumarated rosin, and so forth) in relatively volatile alkalis (for example, ammonium hydroxide, morpholine, monethanolamine, and so forth). These often also contain ethanol and cellosolve to assist in solution of the resin and to control speed of drying. Another aqueous flexographic type, and very important commercially, is the acrylic type. This system uses water-soluble acidic acrylic resins in an alkaline solution (pH about 8–9). Often an alcohol is added to alter drying times.

Carbon black is the most widely used pigment for black flexographic inks. C.I. Direct Black 38, a benzidine-based dye, is also used. However, C.I. Direct black 38 is judged to be a carcinogenic material and there is a need for a water-soluble replacement for this dye. Other Acid Colors have been used.

Nigrosine Base (Color Index 50,415), also known as C.I. Solvent Black 7, is an aniline-condensed dye product which has been produced for over a hundred years. It is made by the condensation of an excess of aniline with nitrobenzene in the presence of iron and hydrochloric acid or aniline hydrochloride. Representative patents disclosing the preparation of Nigrosine include: U.S. Pat. Nos. 1,896,224; 1,988,499; and 4,056,530; and German Patents 44,406 and 890,104.

Nigrosine Sulfonic Acid (Color Index 50,420), also known as C.I. Acid Black 2 (as the sodium salt), is readily prepared by the sulfonation of Nigrosine base and conversion to the sodium salt. Nigrosine Sulfonic Acid, sodium salt, when used in a water-based acrylic flexographic ink, exhibits excessive water bleed, that is, it has poor water resistance. It is, therefore, not a good replacement for C.I. Direct Black 38 or the other Acid Colors that may be used.

The present invention is based on the discovery that the ammonium salt of Nigrosine Sulfonic Acid, when used in a water-based acrylic flexograph ink, provides superior water-resistance properties. The ammonium salt of Nigrosine Sulfonic Acid is believed novel. It may be prepared by merely adding the sodium salt of Nigrosine Sulfonic Acid to concentrated ammonium hydroxide until the ammonium salt is obtained. The dye is readily prepared by simple procedures, is inexpensive and it provides properties in aqueous flexographic inks which have significant commercial importance.

In the following non-limiting examples, all parts and percents are by weight unless otherwise specified.

EXAMPLE 1

Dried Nigrosine Sulfonic Acid, sodium salt (50 grams) was added, with stirring, to an excess of concentrated ammonium hydroxide. The mixture was stirred until the resulting exotherm subsided and then resulting paste was evaporated to dryness in a suitable vented oven. The ammonium salt of Nigrosine Sulfonic Acid resulted.

EXAMPLE 2

A water-based flexographic ink was prepared from the ammonium salt of Nigrosine Sulfonic Acid prepared in Example 1 by mixing the following:

| Ammonium salt of Example 1 | 2 Grams |
| --- | --- |
| Ammonium hydroxide (conc) | 1 Gram |
| Distilled water | 5 Grams |
| Jonacryl 78* | 25 Grams |

*S. C. Johnson & Son, Inc., acrylic ester copolymer

Drawdowns were made on standard enameled white paper using a #7 Meir Bar. The drawdowns were then air dried and tested. The dried drawdowns were pressed between wet filter paper for 72 hours. After 72 hours, the ink made from the ammonium salt of Nigrosine Sulfonic Acid did not shown any signs of bleeding onto the wet filter paper.

EXAMPLE 3

The procedure of Example 2 was repeated except that the sodium salt of Nigrosine Sulfonic Acid was used in place of the ammonium salt. After only 24 hours the ink exhibited considerable bleeding.

What is claimed is:

1. The ammonium salt of Nigrosine Sulfonic Acid.
2. In a water-based, water-resistant black flexographic ink composition, the improvement comprising using as a colorant therein, the ammonium salt of Nigrosine sulfonic Acid.

* * * * *